United States Patent [19]

Kessler

[11] 4,030,589

[45] June 21, 1977

[54] DATA PROCESSING MACHINE

[75] Inventor: Clarence W. Kessler, Dayton, Ohio

[73] Assignee: NCR Corporation, Dayton, Ohio

[22] Filed: Jan. 12, 1976

[21] Appl. No.: 648,543

Related U.S. Application Data

[63] Continuation of Ser. No. 354,453, April 25, 1973, abandoned.

[52] U.S. Cl. .................. 197/1 R; 197/19; 197/16; 235/61.11 D
[51] Int. Cl.² ........................... B41J 5/30
[58] Field of Search ............ 197/1 R, 19, 20, 16; 235/61.9, 61.11 E, 61.11 D; 179/100.2; 178/7.6, 23 R; 340/174.1; 346/74 MP

[56] References Cited

UNITED STATES PATENTS

| 3,063,537 | 11/1962 | Allen .................................. 197/19 |
| 3,352,398 | 11/1967 | Crutcher, III et al. ............ 197/16 |
| 3,514,770 | 5/1970 | Parken ........................... 340/174.1 |
| 3,656,426 | 4/1972 | Potter .................................. 178/23 |
| 3,718,244 | 2/1973 | Bukowski et al. ............... 197/19 X |
| 3,803,388 | 4/1974 | Williamson et al. ......... 235/61.11 D |
| 3,823,405 | 7/1974 | Andreaggi et al. ........... 346/74 MP |
| 3,847,262 | 11/1974 | Higgins ............................. 197/1 R |

Primary Examiner—Ralph T. Radar
Attorney, Agent, or Firm—J. T. Cavender; Albert L. Sessler, Jr.

[57] ABSTRACT

A data reader for use on a movable print head data processing machine wherein a sensing element is positioned on the movable carriage supporting the print head and a recording medium having a pattern of indicia disposed thereon is inserted into the platen for vertical and horizontal position control. Means are provided for disabling the print head when the sensing element is in use. Means are provided for utilizing the output of the sensing element.

19 Claims, 8 Drawing Figures

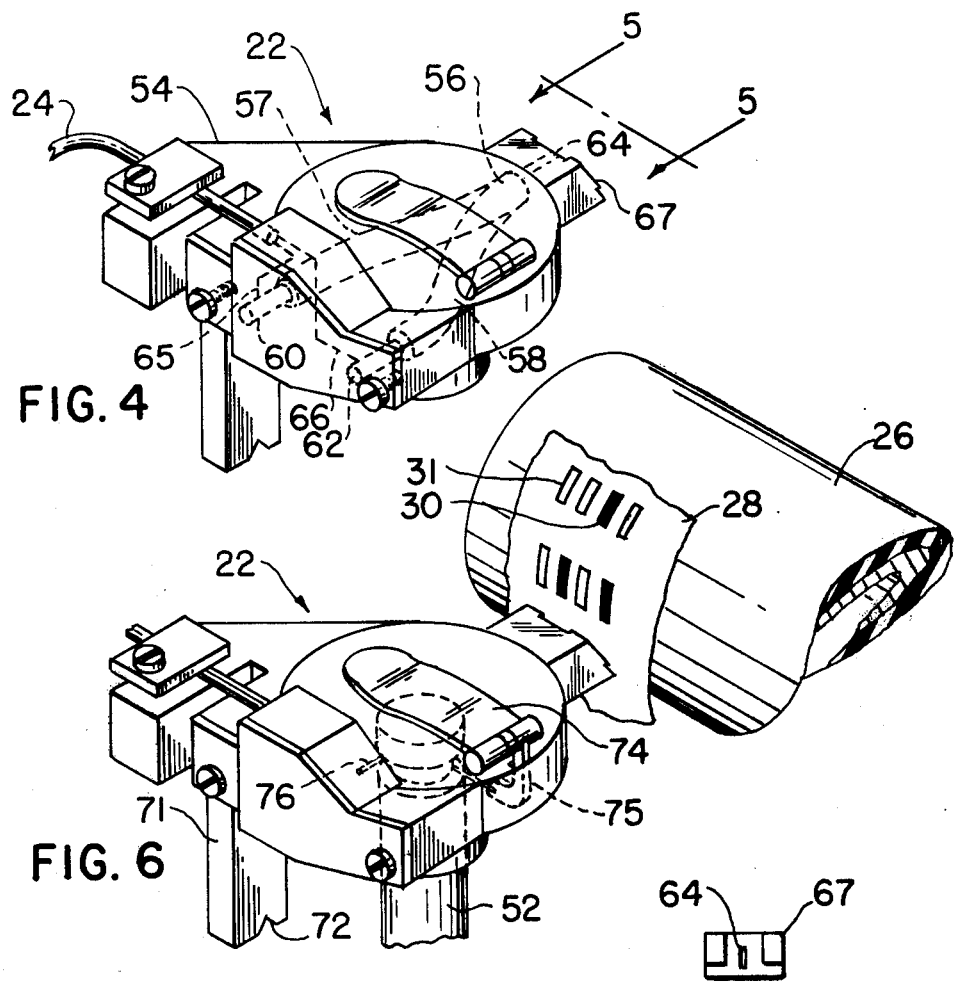
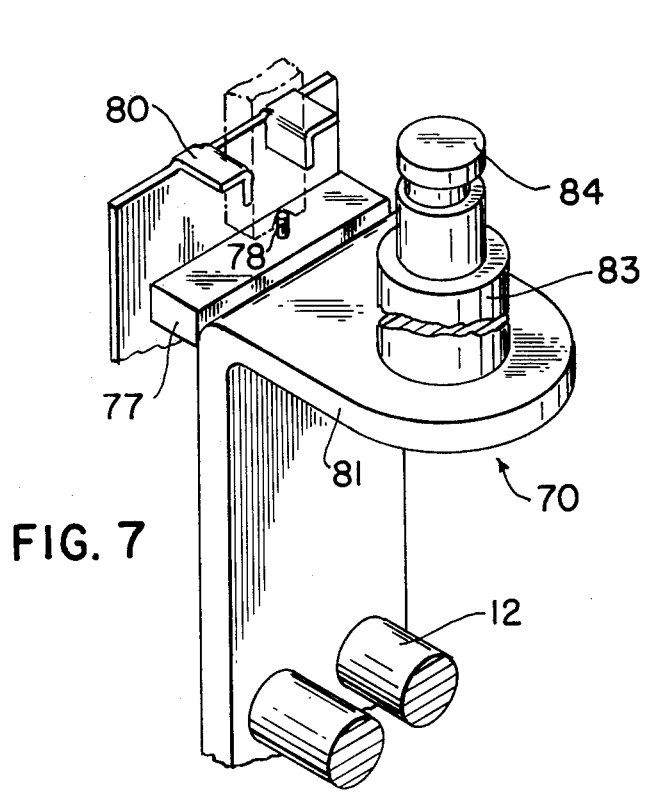
FIG. 4
FIG. 5
FIG. 6
FIG. 7

DATA PROCESSING MACHINE

This is a continuation, division, of application Ser. No. 354,453, filed Apr. 25, 1973, now abandoned.

BACKGROUND OF THE INVENTION

The present invention relates to a data processing machine wherein data can be printed out and wherein data can be read into a processing machine by a sensing means, which scans a pattern of indicia on a recording medium.

Data processing machines of the aforementioned type are used for instance as accounting machines, billing machines or for other types of light computation work. For these purposes it is necessary to enter into the internal memory of the processing machine a program that is associated with the problem to be solved. In the past an optical or magnetic read head, positioned as an auxiliary piece of equipment, was used to read out a punched or magnetized tape, respectively. The electrical signals generated by the head and its associated electronics were then fed to the memory of the processing machine. Data processing systems utilize some form of printing output device. A substantial savings can be achieved if the existing printer can also be used to read data.

In U.S. Pat. No. 3,063,537 entitled "Format Control Device", by J. D. Allen, Jr., there is disclosed a printing device (electric typewriter) which utilizes an optical sensing device, fixedly attached to the typewriter frame for reading a position code from a program form which is located in the typewriter adjacent the work form. The position code controls the horizontal and vertical disposition of the printing on the work form. In addition, control signals can be read from the work to actuate the carriage return, tabulate, and spacing controls of the typewriter.

The control device disclosed in the referenced patent approaches the desired combination but falls short in that the device does not read data for storage in a memory system, and in addition, the referenced device reads the program form while it simultaneously prints out on the work form. It therefore would be highly desirable, in view of the prior art, to have a machine similar to an optical or magnetic tape reader which machine also operated as the printer for the data processing system.

SUMMARY OF THE PRESENT INVENTION

In one preferred embodiment of the present invention there is provided a data processing machine of the type having a serial printing device which is movable in a line direction, for example, a movable ball print head typewriter, onto which is mounted a sensing means. The sensing means when in operation moves in conjunction with the ball print head. A recording medium having a pattern of indicia disposed thereon is scanned by the sensing head to provide electrical signals indicative of the indicia on the recording medium. A means is provided for disabling the serial printing device when the sensing means is in operation. Means are also provided for utilizing the output of the sensing means. The utilization means can for example be a computer memory with the indicia on the recording medium being a format program code for the computer. When the indicia pattern has been read by the sensing head the head is de-energized and the printing head re-energized.

In a preferred embodiment of the present invention the sensing head is comprised of a light source, a photo-detector and a bundle of optical fibers, one end of which is positioned adjacent the recording medium and the other end of which is split into two bundles, one of which terminates at the light source and the other at the photo detector.

From the foregoing it therefore can be seen that a primary object of the present invention is to provide a novel data processing machine.

It is another object of the present invention to provide a data processor wherein a means for sensing data to be read is used in combination with a printer.

It is a further object of the present invention to provide a sensor positioned on the carriage of a movable print head printer for reading indicia positioned on a recording sheet.

These and other objects of the present invention will become more apparent when taken in conjunction with the following description and drawings wherein like characters indicate like parts and which drawings form a part of the present application.

BRIEF DESCRIPTION OF THE DRAWINGS

FIG. 4 is a projection view of the sensing means;

FIG. 5 is an end view of the sensing means taken along the direction lines 5—5 of FIG. 4;

FIG. 6 is a projection view of the sensing head mounted on the movable carriage;

FIG. 7 is a projection view of the sensing head storage mount; and

DESCRIPTION OF THE PREFERRED EMBODIMENT OF THE INVENTION

Figure 1:
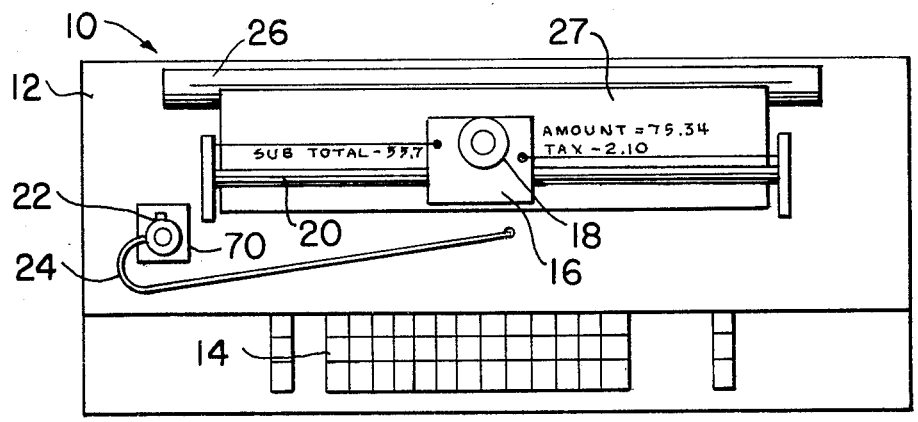
FIG. 1 is a top view of a movable print head printer with the sensing means in a stored position.

In FIG. 1 a movable print head printer 10 is shown comprised in part of a basic frame 12, a keyboard 14, a movable carriage 16 on which is removably mounted a ball type print head 18, a bar guide 20 along which the carriage 16 moves, and a platen 26 rotatably mounted to the frame 12.

The movable print head printer 10 is of the well-known type shown in detail for example in U.S. Pat. No. 2,919,002 entitled "Selection Mechanism for a Single Printing Element Typewriter" by Leon E. Palmer. The details of construction and operation of the printer shown in the referenced patent are incorporated fully herein to provide the well-known details of construction and operation of the present printer. Additional elements comprising the printer of FIG. 1 are a signal cable 24 and a sensing means 22, which means is stored on a storing means 70. The storing means 70 is affixed to the typewriter frame 12 at some appropriate out-of-the-way spot. The printer of FIG. 1, in the configuration shown, operates in the normal well-known manner to print characters onto a sheet of paper 27 under the control of either the keyboard 14 or a central processing unit or utilization means 81 (shown in FIG. 8).

Figure 2:
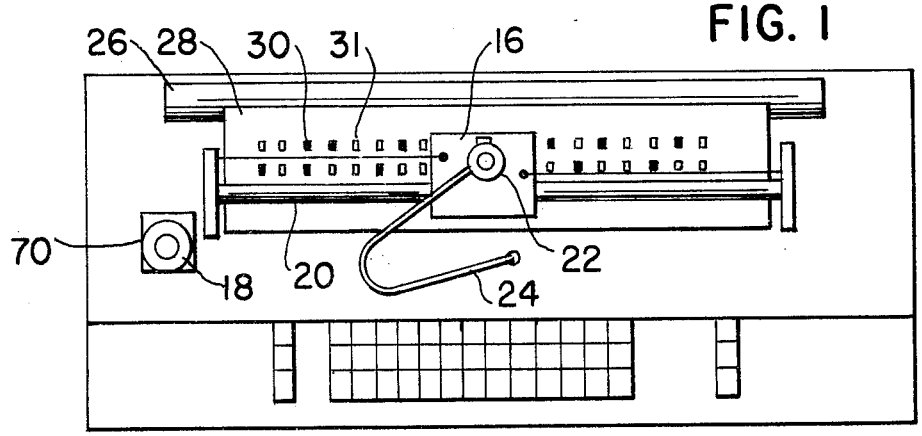
FIG. 2 is a top view of the movable print head printer with the ball type print head removed and the sensing means positioned on the movable print head carriage.

Referring now to FIG. 2, the ball type print head 18 has been removed from the carriage 16 and stored on the storage means 70. The sensing means 22 has been affixed to the movable carriage 16 in place of the ball print head. In addition a recording sheet 28 having vertical code indicia comprised of dark and light areas 30 and 31, respectively, is positioned by the platen 26 in front of the sensing means 22. In operation the carriage 16 is moved back and forth to allow the sensing means to scan the code indicia on the recording sheet. The platen is indexed to move the sheet vertically to a new line of indicia when a line has been read. Electrical signals proportional to the sensed code are transmitted over cable 24 to a utilization means (shown in block form in FIG. 8). The utilization means can be, for example, a read-write memory wherein the code indicia are stored for future machine use. During scan operation, the keyboard 14 is disconnected from the ball print head actuators to prevent rotation, tilting and impacting of the sensing head which is undesirable when sensing the indicia on the recording sheet.

Figure 3:
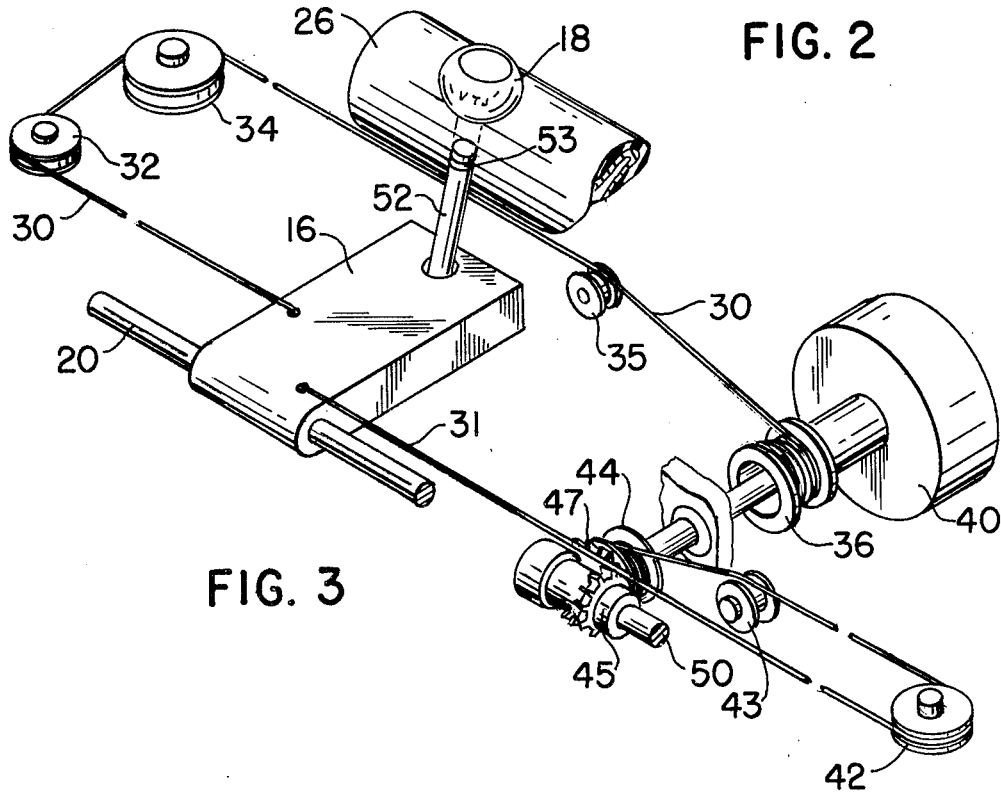
FIG. 3 is a simplified projection view of a means for moving the print head carriage.

Referring to FIG. 3, carriage 16 is indexed along the bar 20 by tension forces which are differentially applied through wires 30 and 31. Wire 30, connected at one end to carriage 16, extends around pulleys 32, 34, 35 and terminates around pulley 36. Pulley 36 is coupled to a spring 40 which maintains a substantially constant tension on wire 30. The wire 31, connected at one end to carriage 16, extends around pulleys 42 and 43 to terminate around pulley 44. A drive motor 83 (shown in FIG. 8) is connected to drive shaft 50, which shaft in turn drives gears 45 and 47. Pulley 44 is directly connected to gear 47. Depending on the direction of rotation of the drive motor 83, the carriage will be driven to the left or to the right.

The shaft 52 extends from the carriage 16, and is rotatable and tiltable with respect to the carriage, by means not shown, but well known, for positioning a desired character on the ball 18 into a print position with respect to the platen 26. A detent 53, on shaft 52, engages a projection within the ball 18 to hold the ball to the shaft.

Referring now to FIG. 4, a sensing means 22 using photoelectric techniques to sense indicia is shown comprised in part of body section 54, which may be formed from plastic, within which is mounted a bundle of fiber optics 56. The bundle is split into two sections 57 and 58. Section 57 terminates at a light source 60. Section 58 terminates at a photoelectric element 62. The other end of the fiber bundle terminates against an optical passageway 64. A cable 24 contains power wires 65 and conductors 66 for coupling electrical signals from the photoelectric element 62 and for providing power to the light source 60. In operation the light source projects a beam of light through the optic bundle 57 to the optical passageway 64. The light that is reflected from a surface positioned in front of the optical passageway is transmitted through optical bundle 58 to the photoelectric element 62. The photoelectric element provides an electrical signal proportional to the amount of reflection sensed. Projections 67 protect the optical passageway 64.

In FIG. 5 the location of the projections 67 and the optical passageway 64 are clearly shown.

In FIG. 6 the sensing means 22 is shown positioned in its operating position on shaft 52. The recording medium 28 is positioned on the platen 26 in proximity to the sensing means. The code indicia consists of vertical dark and light marks 30 and 31 respectively. The code marks may be placed on the recording medium by an operator scribing the medium with a pencil or pen. As the sensing means is scanned horizontally along the recording medium, electrical signals will be transmitted along cable 24 to a utilization means, which signals will be proportional to the amount of reflectance sensed from the code indicia.

Projecting downward from the body 54 to the sensing means is a switch activating arm 71 having a notch 72 formed in one end. The switch arm activates the printing head deactivating means when the sensing means is removed from its storage mount. A lever arm 74 is used to lock the sensing means to the shaft 52 by engaging the groove 53 through an arm 75 connected to an L-shaped wire 76.

In FIG. 7 the support means 70 is shown comprised of an L-shaped base 81 which is fixedly attached to the printer frame 12 at a convenient location. Attached to the base 81 is a support 83 having a projecting member 84 which is identical in shape to the grooved end of shaft 52. A switch 77 which is activated by the movement of a button 78 is attached to the base 81. A plate 80 is attached to the base 81 to provide a guide for the activating arm 71 affixed to the scanning means body 54. The notch 72, in the activating arm 71, engages and depresses the button 78 when the sensing means 22 is correctly positioned on the projecting shaft 84.

Figure 8:
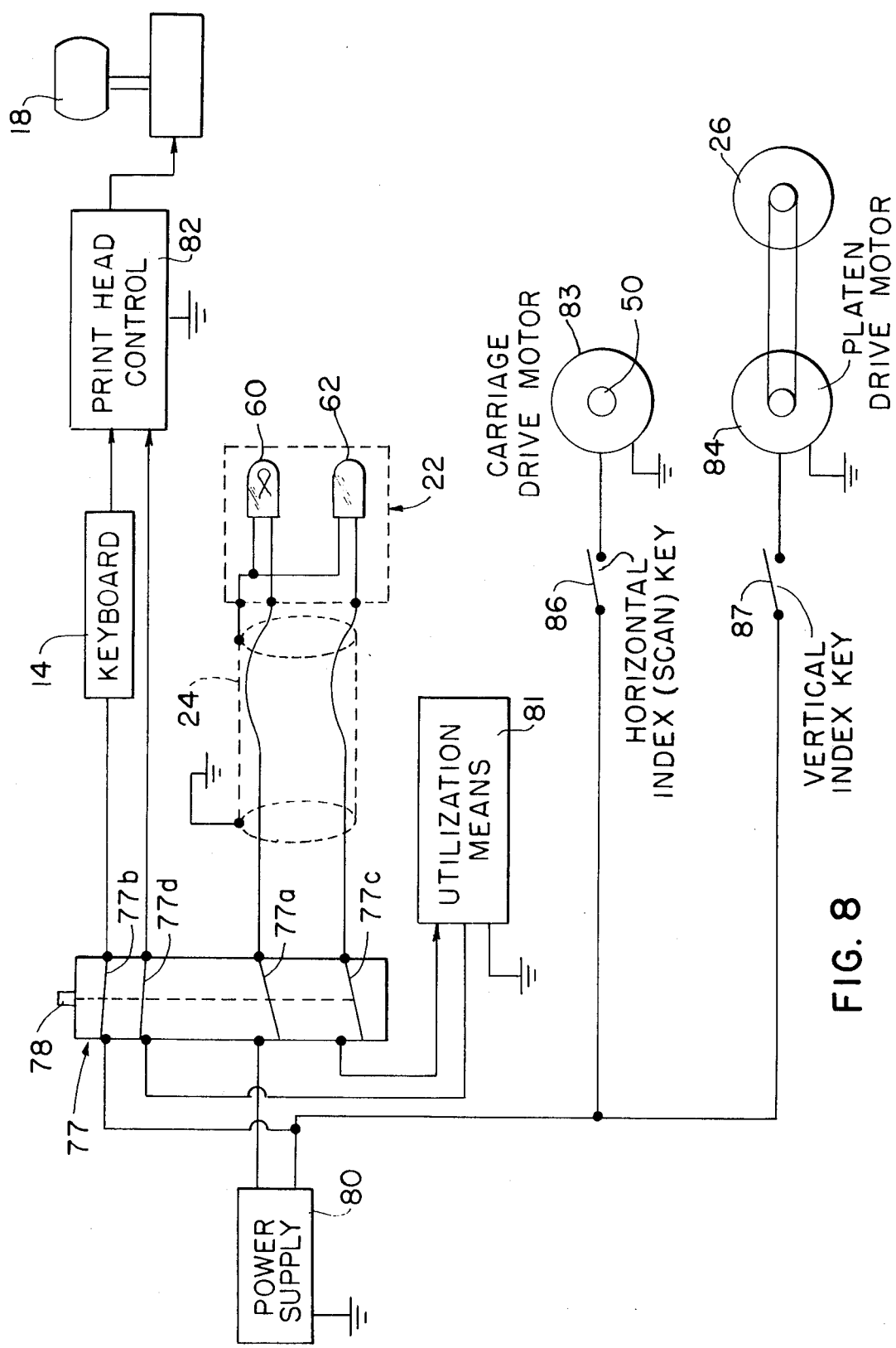
FIG. 8 is a block diagram of the electrical controls for the preferred embodiment.

In FIG. 8 there is shown in block diagram form one simplified control system for operating the print head and sensing means. The power supply 80 provides a low level power signal to the lamp 60 when contact 77a of 77 is closed. The high power level of supply 80 is fed to keyboard 14 through switch contact 77a when the button 78 is depressed by the sensing means being in its proper storage position. The print head 18 is then ready to be activated by keyboard selections which are processed through the print head control unit 82. The unit controls the rotation, tilt, and impacting functions of the print head through mechanisms which are well known in the art, which mechanisms form no part of the present invention. Aside from keyboard control of the print head there can also be control from a central processing unit such as a computer.

The utilization means 81, which may be such a computer, feeds its output through switch contact 77d to the print head control unit 82 when the button 78 is depressed. The photoelectric element 62 sends its output signal through cable 24 to switch contact 77c to the input of the utilization means 81 when the button 78 is up (sensing means removed from support).

The carriage drive motor 83 is coupled to shaft 50 to drive the carriage when the horizontal index key 86 is depressed. The platen drive motor 84, which is coupled to rotate the platen 26, drives the platen to position the recording medium or other paper in the desired vertical position. The vertical index key 87, when depressed, connects power from supply 80 to the motor 84.

While there has been shown what is considered to be the preferred embodiment of the invention, it is manifest that many changes and modifications may be made therein without departing from the essential spirit of the invention. It is intended, therefore, in the annexed claims, to show all such changes and modifications which fall within the true scope of the invention.

What is claimed is:

1. A data reader for use with a printer having a movable print head comprising in conbination:

1. 
   a. a platen for receiving a recording medium having data recorded thereon, the position of said medium being controlled by said platen;
   b. a carriage having a shaft and being movable in a line direction, said shaft supporting said movable print head at times;
   c. read means mounted on the carriage shaft when said movable print head is removed, for converting recorded data on said recording medium into electrical signals, and being removed from said shaft when said print head is mounted thereon;
   d. switching means for activating said read means and deactivating said print head when reading the data from said recording medium; and
   e. utilization means for receiving and utilizing the electrical signals from said read means.

2. The data reader according to claim 1 wherein the data recorded on said recording medium takes the form of light and dark areas and wherein said read means is an optical detector comprised of a light source for illuminating the area of said recording medium adjacent said light source, said detector also comprised of photoelectric means for providing an electrical signal the condition of which indicates the amount of reflected light from the area illuminated by said light source.

3. The data reader according to claim 1 and further comprising:
   means for directing said read head to scan across each line of data rcorded on said recording medium and for indexing said platen to a new line at the end of each read head line scan.

4. The data reader according to claim 2 wherein said optical detector is further comprised of a first portion of optical fibers positioned between said light source and said recording medium for illuminating an area of said recording sheet, and a second portion of said optical fibers positioned between said photoelectric means and said recording medium for transmitting reflected light from said recording medium to said photoelectric means.

5. A data processing machine of the type having a carriage movable in a line direction; a printing device removably positioned on said carriage at times; a sensing means removably mounted on said carriage when said printing device is removed, and being removed from said carriage when said printing device is mounted thereon; a recording medium having a pattern of indicia disposed thereon positioned in sensing proximity to said carriage; means for disabling said printing device during the operation of said sensing means; means for indexing said sensing means to scan the pattern of indicia on said recording medium; and means for utilizing the output of said sensing means.

6. The data processing machine according to claim 5 wherein said sensing means is comprised of:
   a light source for illuminating an area corresponding to the area of one indicia; and
   photoelectric means for receiving the reflected illumination from said illuminated area and for providing an electrical signal proportional to the level of reflection.

7. The data processing machine according to claim 5 and further comprising:
   receptacle means affixed to the frame of said data processing machine for receiving and holding said sensing means during operation of said printing device.

8. The data processing machine according to claim 5 wherein said sensing means is comprised of:
   a light source;
   a photoelectric means;
   a first portion of optical fibers positioned between said light source and said recording medium for illumination of an area of said recording medium, and a second portion of said optical fibers positioned between said photoelectric means and said recording medium for transmitting reflected light from said recording medium to said photoelectric means.

9. A data reader for use with a printer having a movable print head comprising in combination:
   a. a platen for receiving a recording sheet having data recorded thereon, the position of said sheet being controlled by said platen;
   b. support means for removably supporting said print head;
   C. removable read means supported by said support means when said print head is removed from said support means, said read means when mounted on said support means being operative for converting recorded data on said recording sheet into electrical signals, said read means being removed from said support means when said print head is mounted thereon;
   d. utilization means for utilizing the electrical signals from said read means; and
   e. means for coupling the electrical signals from said read means to said utilization means.

10. The data reader according to claim 9 wherein the data recorded on said recording sheet takes the form of light and dark areas and wherein said read means is an optical detector comprised of a light source for illuminating the area of said recording sheet adjacent said light source and photoelectric means for providing an electrical signal the condition of which indicates the amount of reflected light from the area illuminated by said light source.

11. The data reader according to claim 9 and further comprising:
    means for directing said read head to scan across each line of data recorded on said recording sheet and for indexing said platen to a new line at the end of each read head line scan.

12. The data reader according to claim 10 wherein said optical detector is further comprised of a first portion of optical fibers positioned between said light source and recording sheet for illuminating an area of said recording sheet, and a second portion of said optical fibers positioned between said photoelectric means and said recording sheet for transmitting reflected light from said recording sheet to said photoelectric means.

13. A data processing machine of the type having a serial printing device movable in a line direction by a carriage comprising in combination:
    support means for removably affixing said printing device to said carriage;
    a removable sensing means mounted on said support means when said printing device is removed and being removed from said support means when said printing device is mounted on said support means;
    a recording medium having a pattern of indicia disposed thereon positioned in sensing proximity of said sensing means;
    means for indexing said sensing means to scan the pattern of indicia on said recording means; and means for utilizing the output of said sensing means.

14. The data processing machine according to claim 13 and further comprising:
means for affixing said sensing means to a stationary portion of said data processing machine when said sensing means is not in use.

15. The data processing machine according to claim 13 wherein said sensing means is comprised of:
a light source for illuminating an area corresponding to the area of one indicia; and
photoelectric means for receiving the reflected illumination from said illuminated area and for providing an electrical signal proportional to the level of reflection.

16. A data reader for use with a printer having a movable print head comprising in combination:
a. a platen for receiving a recording medium having data recorded thereon, the position of said medium being controlled by said platen;
b. a carriage having a shaft and being movable in a line direction, said shaft removably supporting said removable print head at times;
c. read means removably mounted on the carriage shaft when said movable print head is removed, for converting recorded data on said recording medium into electrical signals, said read means being removed from said carriage shaft when said print head is mounted thereon; and
d. utilization means for receiving and utilizing the electrical signals from said read means.

17. A data reader for use with a printer having a movable print head comprising in combination:
a. a platen for receiving a recording medium having data recorded thereon, the position of said medium being controlled by said platen;
b. a carriage movable in a line direction and removably supporting said movable print heat at times;
c. read means removably mounted on the carriage when said movable print head is removed, said read means being operative for converting recorded data on said recording medium into electrical signals, said read means being removed from said carriage when said print head is mounted thereon;
d. means for activating said read means and deactivating said print head when reading the data from said recording medium; and
e. utilization means for receiving and utilizing the electrical signals from said read means.

18. The data processing machine according to claim 5 and further comprising:
receptacle means affixed to the frame of said data processing machine for receiving and holding whichever of the printing device or sensing means is not in use at a given time.

19. A data processing machine of the type having a frame and a carriage movable in a line direction;
a printing device removably positioned on said carriage at times;
a sensing means removably mounted on said carriage when said printing device is removed and being removed from said carriage when said printing device is mounted thereon;
a receptacle means affixed to the frame of said data processing machine for receiving and holding said sensing means during operation of said printing device;
switching means for disabling said sensing means during the time that said sensing means is held in said receptacle means, including switch actuating means on said sensing means coacting with said switching means when the sensing means is placed in operative relation to said receptacle means; and
means for utilizing the output of said sensing means.

* * * * *

UNITED STATES PATENT OFFICE
CERTIFICATE OF CORRECTION

Patent No. 4,030,589   Dated June 21, 1977

Inventor(s) Clarence W. Kessler

It is certified that error appears in the above-identified patent and that said Letters Patent are hereby corrected as shown below:

Column 6, line 65, "of" should be --to--.

Signed and Sealed this

Twenty-third Day of May 1978

[SEAL]

Attest:

RUTH C. MASON
Attesting Officer

LUTRELLE F. PARKER
Acting Commissioner of Patents and Trademarks